United States Patent Office 3,544,320

Patented Dec. 1, 1970

3,544,320
STABILIZATION OF LIGHT SENSITIVE FILM WITH A PEROXIDE, PERCHLORATE OR PERBORATE

Yoshikazu Yamada, 170 Lowell Ave., Sierra Madre, Calif. 91024, and Lester F. M. Storm, 380 S. Mentor, Pasadena, Calif. 91106

No Drawing. Filed July 21, 1966, Ser. No. 566,726
The portion of the term of the patent subsequent to Dec. 23, 1986, has been disclaimed
Int. Cl. G03c 5/24
U.S. Cl. 96—48 17 Claims

ABSTRACT OF THE DISCLOSURE

A process for stabilizing a photographic image formed by image-wise exposure to actinic light of a photosensitive combination of an organic halogen compound and an aromatic nitrogen-containing compound, in a solid film-forming hydrophilic binder wherein the background and image areas are stabilized by the application of a solution of a compound selected from (1) organic peroxides and hydroperoxides and (2) inorganic peroxides, perchlorates and perborates. In specific embodiments, the solution is an aqueous solution of a water-miscible organic solvent and in broader embodiments, such a solution can be utilized in conjunction with any stabilizer.

This invention relates to photosensitive compositions, films or articles and to improved stabilization methods relating thereto. In particular, this invention relates to a method of stabilizing or fixing images obtained with organic photosensitive compositions.

In general, it is old and well known in the photographic arts to provide photographic systems involving two or more organic materials which react under the influence of actinic light to produce a color. As early as 1921, Murray C. Beebe and his coworkers described numerous organic photographic systems (e.g., U.S. Pats. Nos. 1,574,357; 1,574,358; 1,574,359; 1,575,143; 1,583,-519; 1,587,269; 1,587,270; 1,587,271; 1,587,272; 1,587,-273; 1,587,274; 1,604,674; 1,618,505; 1,655,127; 1,658,-510; and 1,820,593). Generally, these systems relate to the use of various halogen compounds (e.g., iodoform and others) in combination with a second ingredient, in which Beebe and subsequent workers have theorized that light effects the release of a radical from the halogen compound which carries out a color-forming reaction with the second compound. Subsequent workers such as Eugene Wainer (e.g., U.S. Pats. Nos. 3,042,515; 3,042,-516; 3,042,517; 3,042,518; 3,042,519; 3,046,125; and 3,056,673) and Robert Sprague (U.S. Pat. No. 3,082,-086), as well as a number of other workers since the time of Beebe, have continued the development of various photographic systems involving a photo-energized reaction of a combination of a halogen-containing compound and one or more other compounds. Other recent disclosures include British Pat. No. 917,919 and Belgian Pat. No. 596,094.

More recently, it has been discovered that incorporation of certain of the above combinations as dispersions in a continuous phase, e.g., gelatin, in which such combinations are substantially insoluble, results in a photographic composition of superior speed, sensitivity and other properties. This discovery has been described in an application of Yoshikazu Yamada and Thomas H. Garland, Ser. No. 481,759, filed Aug. 23, 1965, entitled "Production and Use of Photosensitive Compositions and Films." In that application, it is explained that the selection of an aromatic N-containing compound as there described merely for its ability to form some sort of color with a halogen-containing compound under the influence of actinic light is a practical minimum for purposes of demonstrating the invention.

A drawback of exposed films incorporating the above compositions is their tendency to darken upon prolonged exposure to light. It is an object of this invention to provide a method of stabilizing exposed photographic compositions which utilize the organic photosensitive combinations described above. It is a further object to stabilize compositions which comprise a dispersion of an organic halogen compound and a second ingredient. It is a particular object to provide a method for stabilizing such photographic compositions dispersed in a non-solubilizing continuous phase. Another object is to provide a method for stabilizing a photographic composition dispersed in a water penetrable continuous phase. It is a still further object to provide a method wherein a photographic image is effectively stabilized against darkening of background areas and can be used repeatedly as a master in diazo and other reproduction processes, involving repetitious exposure to light of any wavelength. Other and further objects, features and advantages of this invention will become apparent from the following description thereof.

Thus, in one embodiment this invention relates to a process in which a photographic image is formed by image-wise exposure to actinic light of a photosensitive combination of at least two starting agents, one of which is an organic halogen compound and the above objects and others are accomplished by providing an improvement whereby light sensitive areas remaining after formation of the image are desensitized, which improvement comprises subjecting such areas to a desensitizing amount of a compound having a reactive oxygen atom.

In the broader aspects of this invention any compound having a reactive oxygen atom in the context of the photo system employed can be used. In particular those compounds are preferred that have a significant solubility in water or an organic solvent, the term "significant" referring to a solubility that is adequate to provide a desensitizing amount of compound as per the invention hereinafter described. It is also preferred that such compounds be selected from (1) organic peroxides and hydroperoxides and (2) inorganic peroxides, perchlorates and perborates.

Examples of suitable inorganic peroxides include hydrogen peroxide, sodium peroxide, cesium peroxide and rhenium peroxide. Examples of suitable inorganic perchlorates include perchloric acid, sodium perchlorate, aluminum perchlorate, ammonium perchlorate, barium perchlorate, cadmium perchlorate, cesium perchlorate, cobalt perchlorate, copper perchlorate, gallium perchlorate, indium perchlorate, iron perchlorate, lead perchlorate, lithium perchlorate, magnesium perchlorate, nickel perchlorate, strontium perchlorate, thallium perchlorate and zinc perchlorate. Sodium perborate, potassium perborate, and the like, are examples of suitable inorganic perborates.

In making up solutions of hydrogen peroxide it is convenient to use it in a combined form with a carrier material. For example, urea peroxide, $H_2NCONH_2 \cdot H_2O_2$, which contains about 36 weight percent hydrogen peroxide, can be used as a convenient and safe method of adding hydrogen peroxide to a solution.

The organic peroxides and hydroperoxides are preferred compounds as they are generally more effective and more readily handled. Suitable organic hydroperoxides, which are meant to encompass peroxy acids and dibasic acid peroxides, include succinic acid peroxide, tert-butyl-hydroperoxide, 2,5-dimethylhexane-2,5-dihydroperoxide, cumene hydroperoxide, acetyl hydroperoxide, cyclohexyl hydroperoxide, ethyl hydroperoxide, methyl hydroperoxide and perbenzoic acid. Suitable organic peroxides include: the aromatic and aliphatic diacyl peroxides such as dibenzoyl peroxide, di(p-chlorobenzoyl) peroxide, di(2,4-dichlorobenzoyl) peroxide, di(1-naphthyl) peroxide, di(3-nitrobenzoyl) peroxide, di(4-nitrobenzoyl) peroxide, dilauroyl peroxide, didecanoyl peroxide, didodecanoyl peroxide, diacetyl peroxide, dipropionyl peroxide and acetyl benzoyl peroxide; the ketone peroxides such as bis(1-hydroxycyclohexyl) peroxide, cyclohexanone peroxide and bis(2,2-dihydroperoxybutane); peroxyesters, including carbonate ester peroxides, such as tert-butyl peroxy, tert-butyl peroxyacetate, tert-butyl peroxyisobutyrate, tert-butyl peroxypivalate, tert-butyl peroxybenzoate, tert-butyl peroxymaleic acid, di-tert-butyl-di (peroxyphthalate), 2,5 - dimethylhexane-2,5-(peroxybenzoate) and diisopropyl peroxydicarbonate; and dialkyl peroxides such as di-tert-butyl peroxide, 2,5-dimethyl-2,5-di(tert-butyl peroxy)hexane, 2,5 - dimethyl-2,5-di(tert-butyl peroxy)hexyne-3, n-butyl-4,4-bis-(tert-butyl peroxy)valerate, dicumyl peroxide, diacetyl peroxide, diethyl peroxide and hexafluorodimethyl peroxide. The dialkyl peroxides are preferred, and in particular di-tert-butyl peroxide; they are the most effective compounds when used with the preferred photographic systems to be described.

The exposed film may be dipped into a solution of one or more of the above compounds or it may be sprayed or wiped with the solution. In this latter case, the solution may contain a thickener such as polyvinyl alcohol or carboxymethylcellulose. The solution may be entirely aqueous or may be the preferred aqueous solution of water-miscible organic solvent to be described.

In general, any amount of the desensitizing compound will diminish background darkening of the image; a practical upper limit is about 15 weight percent of the solution and generally about 0.1 weight percent will noticeably prevent such darkening. A preferred range is from about 0.5 to about 10 weight percent. When dipping the exposed film into a bath containing the desensitizer, immersion for from about 30 seconds to about 30 minutes is generally satisfactory.

In a negative-working system the photosensitive film is subjected to actinic light in an image-wise projection (or exposure) wherein light is projected through the transparent or translucent areas of the original image to corresponding areas which are "light-struck" on the photosensitive film; and these light-struck areas ultimately appear as the darker colored areas either as a result of direct print-out by the projected actinic light or as a result of subsequent heating or other treatment. The areas that are not "light-struck" during the image-wise initial exposure retain their photosensitivity (as in the case of non-light-struck silver halide areas in silver photography). The instant invention provides a method of desensitizing these areas so that they will not later develop or otherwise impair the desired image on the film during storage or subsequent use.

A particularly important use involved in the practice of the instant invention is in the diazo reproduction system. In such a system, a so-called diazo master or intermediate is prepared, by a negative-working mode, and this diazo intermediate is employed in conjunction with actinic near ultraviolet light to produce a succession of prints on diazo paper. In this use the diazo intermediate is subjected to repeated exposure of actinic near ultraviolet light and the instant invention provides a method for desensitizing previously unexposed areas of the diazo intermediate such that such background areas will not develop or darken during such repeated exposure.

In one preferred embodiment of the invention, the photosensitive combination comprises at least two starting agents, (a) and (b), one of which, (b) is an organic halogen compound. In other preferred embodiments, the other starting agent, (a) is a nitrogen atom-containing compound having certain structural characteristics. Thus, our process is particularly suitable when the nitrogen atom-containing compound used in the photosensitive combination has a nitrogen atom attached directly to at least one benzene ring, said benzene ring being free from carbon atom substitution in the position para to said nitrogen atom attachment. The process is also particularly suitable with nitrogen atom-containing compounds in which the nitrogen atom is a member of a heterocyclic ring. Still another type of nitrogen atom-containing compound with which the process is particularly useful is an N-vinyl compound.

It will be appreciated that there is substantial overlap between the above types of nitrogen-containing compounds and that the process is useful with photosensitive combinations that are formulated with nitrogen atom-containing compounds falling within one, two or even all three of the above terms; e.g., N-vinylcarbazole. It will also be appreciated that there is no generic term available in accepted chemical terminology that will effectively embrace all of the above types of nitrogen atom-containing compounds. It is merely important to note that photosensitive combinations containing a compound which has at least one of the above characteristics can be readily desensitized by the process of this invention. Photosensitive combinations containing compounds having more than one of the above characteristics lend themselves even better to the process. Examples of particularly effective nitrogen atom-containing compounds include N-vinylcarbazole, N-ethylcarbazole, indole and diphenylamine.

In another embodiment of this invention, the combinations desensitized by our process are dispersed in the form of discrete globules in a continuous water-penetrable phase in which the combination is substantially insoluble. Such dispersions are discussed in detail in the above-mentioned Yamada and Garland application. Generally, the solid-film-forming component used to achieve a continuous phase may be any of a number of generally photographically inert materials, which are, in most cases, soluble in water or so finely dispersible therein in the concentrations of use that for practical purposes there is no distinction between solution and dispersion for these materials in the continuous phase. Such materials include the starch and starch derivatives, proteins (i.e., casein, zein, gelatin, thiolated gelatin, etc.), alginates, gums, and the like materials which are generally considered to be natural derivatives of natural film-forming materials, any one of which in its conventional "water-soluble" form is used in the practice of the instant invention. In addition, synthetic water-soluble film-formers may also be used to particular advantage in the practice of the invention and such materials include polyvinyl alcohol, commercially available water-soluble polyacrylics or acrylates (i.e., water-soluble polyacrylic acid salts having substantially the molecular weight and water compatibility of the polyvinyl alcohol), various commercially available amine or amine-aldehyde resins, etc. Also, a number of cellulose derivative film-formers may be used, and these include the various water-soluble cellulose ethers, carboxymethylcellulose, hydroxypropylmethylcellulose, etc. Essentially these materials are photo-insensitive and their principal function is that of forming the desired film which will retain the dispersed phase in discrete particle form. Of the above materials, gelatin, casein, polyvinyl alcohol, gum arabic, starch, alkali metal carboxymethylcellulose (e.g., sodium carboxymethylcellulose) and hydroxyethylcellulose are particularly useful in this invention.

The use of nitrogen-containing compounds, particularly N-vinyl compounds, as part of the photosensitive combination is also described in detail in the above-mentioned Yamada and Garland application, as well as in several of the above-cited patents. When an N-vinyl compound is used in a non-solubilizing continuous phase, a complication arises which is solved by an embodiment of the present invention. In the environment of such a continuous phase the combination of organic halogen and N-vinyl compound is capable of undergoing two separate and distinct reactions on exposure to actinic light. In one reaction, in a negative-working mode, a colored material is formed in light-struck areas. In another reaction, in a positive-working mode, "colorless" polymer is thought to be first formed and subsequent blanket exposure to "stronger" light, forming a color in the initially non-light-struck areas, yields a positive-working image. These two reactions are competitive, the kinetics of which say that one or the other will predominate depending on the wave-length-intensity-exposure of light, with the "colorless" polymer-forming reaction occurring with "weaker" light. The result is that in the negative-working mode in fringe areas of exposure, especially where the exposure is by projection or in contact exposure where the contact is not exact and uniform, some polymeric reaction takes place; not enough reaction to form a line of demarcation between the image and non-image areas, but enough to form a polymeric coating around globules of material that are still photosensitive and capable of forming colored material. This same effect is also found when reproducing tonal images in both the positive and negative working modes; those areas of the image which receive only a slight exposure to light tend to form polymeric coatings around globules of still photosensitive materials. Even in those areas which are not exposed to imaging light, if a heat-treatment is used to bring out the image, some polymer may form as a result of previous slight light exposure during preparation of the coating and handling of the coated paper. Thus, if extreme measures are not taken to exclude all traces of actinic light during preparation of the coated paper, exposure to such traces of light may be sufficient, on subsequent heat-treatment, to form a polymeric coating around still photosensitive material. These fringe, tonal and partially "exposed" areas are particularly difficult to desensitize as the polymeric coating is impenetrable by most desensitizing materials. The desensitizing material must be capable of some penetration into the thin polymeric encapsulating coating without adversely reacting with the colored portions of the image or adversely affecting the texture of the coating. Most materials that can effectively penetrate the polymeric phase react with the uncoated portion and discolor or bleach the image. Our invention provides a method which effectively stabilizes the image obtained in both the negative and positive working modes without discoloration or bleaching.

Thus, as another embodiment of our invention, we provide an improvement whereby light sensitive areas remaining after formation of an image, as above, are desensitized, which comprises subjecting said areas to a solution comprising substantial amounts of (1) water and (2) an organic solvent having significant miscibility in water, said solution containing a desensitizing amount of a desensitizer for said agent.

In this aspect of our invention, novelty resides in the use of the aqueous organic solvent solutions which are particularly adopted to enable a desensitizing material to penetrate both the water-penetrable continuous phase and polymeric encapsulating coating. In this regard the choice of desensitizer need not be limited to the particular compounds described and preferred above but the effect of any desensitizer can be appreciably enhanced when used in this method of the invention. It is preferred that the desensitizers described above be used in conjunction with the aqueous organic solvent solution just described. Examples of other desensitizers that can be used include ammonium, alkaline earth and alkali metal sulfites, bisulfites and metabisulfites as described in an application by Yoshikazu Yamada and Thomas H. Garland, entitled "Photographic Method"; ammonium and alkali metal bisulfite-carbonyl complexes as described in an application by Peter Bruck, entitled "Photographic Method"; and substituted phenols, hydroquinones and ethers thereof as described in an application by Yoshikazu Yamada and Lester F. M. Storm, entitled "Photographic Treatment"; all the foregoing applications filed concurrently herewith.

The choice of solvent depends on the particular desensitizer used and is preferably one in which the desensitizer is soluble and which is itself miscible to a significant extent in water. For example, hydrogen peroxide is soluble in water, alcohol and ether and a mixture of water and alcohol, ether, or both, can be used as a solvent for hydrogen peroxide. Sodium perborate is sufficiently soluble in ethyl alcohol and glycerol so that adequate water can be added to the ethyl alcohol or glycerol to enable the solution to penetrate the water-penetrable phase of the film. Di-tert-butyl peroxide has infinite solubility in acetone and enough water can be added to allow penetration of both the water-penetrable and polymeric portions of the film. The solubility in the common solvents of the various desensitizers described above are, for the most part, known or can readily be determined by simple methods known to the art. In those cases where a particular desensitizer and a particular solvent is desired but the solubility of the desensitizer in that solvent is not sufficient for purposes of this invention then a second or even third organic solvent can be added, e.g., most of the desensitizers would have sufficient solubility in a mixture of acetone, ethanol or benzene; or methanol, ether and octane. The solvent ratios can be adjusted to afford proper solubility of the desensitizer in the aqueous solutions. Solvents useful in this invention include ethanol, methanol, isopropanol, ether, acetone, benzene, octane, glycerol, m-dioxane, p-dioxane, chloroform, acetic acid, ethyl acetate, carbon tetrachloride, carbon disulfide, dimethylsulfoxide, tetrahydrofuran, and the like. Acetone, the dioxanes, tetrahydrofuran and methanol are particularly suitable solvents.

In general, from about 5 to about 90 volume percent of water is added to the organic solvent; in any case, the amount of water present should be insufficient to cause substantial precipitation of the desensitizer from the solution. It is preferred to use at least 10 volume percent water.

In general, the solutions are slightly acidic, e.g., about pH 6 for di-tert-butyl peroxides in acetone and water. Small amounts, up to a few volume percent, of acid, e.g., HCl, or base, e.g., NaOH, can be added to the stabilizing solution to alter the tone of the print. Generally, adding base increases the image contrast and adding acid decreases the image contrast.

In another method the desensitizing compound is contained in the recording medium itself, that is, it is incorporated into the binder or continuous phase along with the photosensitive combination. This method is particularly applicable where the photosensitive combination is substantially insoluble in the continuous phase, such as the dispersions described above, and where the continuous phase is penetrable by solvent in which the desensitizer has significant solubility. The desensitizer can be "activated" by immersing the recording medium into such solvent for a time sufficient to penetrate the continuous phase, from about a few seconds to about 5 minutes, whereupon the desensitizer is brought into intimate contact with the photosensitive material rendering it photo-insensitive. Suitable solvents include those enumerated above. Generally from about 0.1 to about 15 weight percent of desensitizer, based on the weight of the continuous phase, can be added.

Where the continuous phase is water penetrable, water can be supplied as above or by incorporation into the binder of a water-releasing agent which releases water on the application of heat. Suitable water-releasing agents include: sodium sulfate decahydrate (Glauber's salt, which loses 10 molecules of water at 100° C.); sodium tetraborate decahydrate (borax, which loses 8 molecules of water at 60° C.); potassium aluminum sulfate (kalinite, which loses 9 molecules of water at 64.5° C.); sodium orthophosphate monohydrogen, both dodecahydrate and heptahydrate (each of which loses 5 molecules of water at 35° C. and 48° C., respectively); lithium nitrate trihydrate (which loses 2.5 molecules of water at 29.9° C.); and the like. Other materials that can be used include sodium triphosphate, sodium metasilicate, sodium alginate, sugar, and the like. It is preferable to use a more unstable hydrate, even containing less available water rather than hydrate which loses more water but at a higher temperature, so as to avoid prolonged heating of the photographic medium. Generally, from about 0.5 to about 15 weight percent of water as water-releasing agent can be added, based on the weight of the continuous phase. In order to "activate" the desensitizer the recording medium containing the water-releasing agent can be heated to an appropriate temperature, by placing over a heated platen, or by exposure to infrared, or in any convenient manner, whereupon water is released which carries the desensitizer into intimate contact with the photosensitive material, rendering it photo-insensitive.

The desensitzer reacts with the photosensitive material to destroy its photosensitivity or by some means prevent the photo-reaction. It is, therefore, surprising that such compounds could be incorporated into the binder without seriously affecting the photosensitivity of the product, especially when they are incorporated at the dispersion stage of preparation. When the dispersion is obtained by violently agitating the photosensitive materials in the continuous phase, the desensitizer can be added after substantial dispersion. It is found that particularly good results are obtained if the photosensitive material or one of the components thereof is first dissolved in a solvent therefor, which may be only a small amount, and then dispersed in the continuous phase with consequent volitalization of solvent. In general, little agitation is needed when a solvent is so used. For example, when a combination of N-vinylcarbazole and carbon tetrabromide is used as the photosensitive material, the N-vinylcarbazole, the carbon tetrabromide, or both, can be dissolved in a small amount of acetone, added to a continuous phase of aqueous gelatin and stirred to form discrete globules of photosensitive material upon volitalization of acetone. The desensitizer can then be added. Products formed in such manner have substantially full photosensitivity until the desensitizer is "activated" as above. The preparation of dispersions by the foregoing methods is described in detail in the Yoshikazu Yamada and Thomas H. Garland application Ser. No. 481,759, referred to above. Further details and procedures for incorporating the desensitizer can be found in an application by Yoshikazu Yamada and Lester F. M. Storm, entitled "Photographc Compositions," filed concurrently herewith.

The processes of our invention are particularly suitable to desensitizing photosensitive combinations in which the organic halogen compound is selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto. Compounds of this preferred group are described in U.S. Pats. 3,042,515; 3,042,516 and 3,042,517 an the descriptions and disclosures of these patents are hereby incorporated by reference. Examles of suitable organic halogen compounds include bromotrichloromethane, bromoform, iodoform, 1,2,3,4 - tetrabromobutane, tribromoacetic acid, 2,2,2-tribromomethanol, tetrachlorotetrahydronaphthalene, 1,1,1-tribromo-2-methyl-2-propanol, carbon tetrachloride, p - dichlorobenzene, 4 - bromobiphenyl, 1-chloro - 4 - nitrobenzene, p - bromoacetanilide, 2,4 - dichlorophenol, 1,2,3,4 - tetrachlorobenzene, 1,2,3,5 - tetrachlorobenzene, brominated polystyrene, n - chlorosuccinimide, n - bromosuccinimide, 2 - chloroanthraquinone, tetrabromophenolphthalein, tetrabromo - o - cresol, and the like. Particularly effective compounds include carbon tetrabromide, tribromochloromethane, dibromodichloromethane, pentabromoethane, ethyl tribromoacetate, hexachloroethane and hexabromoethane. In general, bromides are preferred.

Organic halogen compounds that are most particularly suitable with this invention have the formula $$Br—C—(X)(X')(X'')_n(CY_3)_{1-n}$$

wherein X, X' and X'' are halogens, each Y is independently selected from the group consisting of halogen, hydrogen, hydroxy, methyl and methylol and $n$ is selected from 0 and 1, such that when $n$ is 0, X and X' are Br. Such compounds are more readily obtainable than others and yield better results.

In general, the weight ratios of the nitrogen-containing and halogen compound starting agents, (a) and (b) respectively, may vary widely, from a minimum practical weight ratio of (a):(b) of about 1:5 to a maximum ratio of about 50:1. If the proportion of halogen compound used is greater than that specified in the foregoing range, it is ordinarily found that no practical advantage is obtained, and, in general, the weight ratio of (a):(b) used is not below about 1:2, except in special situations wherein losses of a halogen compound (e.g., carbon tetrabromide) are contemplated prior to the actual use. Also, if the amount of halogen compound used is less than the minimum just specified, the combination may be inadequately photosensitive. When a combination of two or more organic halogen compounds are used in the practice of the instant invention in a continuous water penetrable phase, it has been found that advantages are obtained often in the use of weight ratio of 5:1 to about 20:1.

With regard to the relative weights of (1) the solid compounds (a) and (b) in the dispersed phase compared to (2) the solids in the continuous phase, it is found that the solids weight ratio of (1):(2) is preferably about 1:2, but may range from a maximum practical ratio of about 5:1 to a practical minimum ratio of about 1:50. The continuous phase may be 100% "solids" in the sense that the entire system solidifies without any loss of water, but generally the solids-to-liquid ratio in the continuous phase is within the range of about 1:1 to about 1:30.

Preferably, also the dispersed phase particles are in the range of about 0.1 to about 20 microns, but the preferred range is about 0.3 to 10 microns, with an average particle size preferably of about 3 to 4 microns.

Further descriptions and examples of nitrogen atom-containing compounds, organic halogen compounds, dispersing mediums and other facets of compositions that can be desensitized by our process are given in the Yamada and Garland application referred to above, the disclosure of which is hereby incorporated by reference.

The following examples illustrate various embodiments of this invention:

EXAMPLE 1

The following formulation was prepared and coated on sheets of baryta paper, 0.003" wet thickness, and dried gently at 24° C.:

Aqueous gelatin, 20%—50 ml.
N-vinylcarbazole—4 g.
Carbon tetrabromide—3.2 g.
Ethyl acetate—2.4 ml.
Aerosol OT, 37.5%—8 drops The gelatin solution was heated and the other ingredients were added with strong agitation until a uniform dispersion was achieved. The ethyl acetate and Aerosol OT were present to aid dispersion, and are optional.

The above coated sheets were exposed to an 8× projected positive Kodachrome image (Bell & Howell Slide Projector, 300 watt lamp, at 3 feet) for 10 seconds, left at room temperature for 15 minutes to enable a colorless polymer image to form, exposed for 1 second with a sun lamp at 7.5 inches and then developed for 1 hour at 140° C. to obtain positive mode photographs.

Prints A and B, prepared as above, were dipped for 10 minutes into the following respective formulations:

(A)

| | Ml. |
|---|---|
| Aqueous hydrogen peroxide, 30% | 2.5 |
| Acetone | 12.5 |

(B)

| | |
|---|---|
| Di-tert-butyl peroxide | 70 |
| Acetone | 15 |
| Water | 15 |

After treatment, the prints were dried and exposed to fluorescent light (two 15 watt lamps at 12 inches distance) for 26 hours. The prints were substantially stabilized.

EXAMPLE 2

Coated sheets were prepared as in Example 1, contact exposed through a positive transparency and developed at 140° C. for a time sufficient to develop a good density in the areas of maximum exposure without discoloring high-light areas. Negative mode prints A, B, C and D were obtained and were dipped for 10 minutes into the following respective formulations:

(A)

| | Ml. |
|---|---|
| Water (control). | |

(B)

| | |
|---|---|
| Aqueous hydrogen peroxide, 30% | 15 |
| Acetone | 85 |

(C)

| | |
|---|---|
| Di-tert-butyl peroxide | 15 |
| Acetone | 75 |
| Water | 10 |

(D)

| | |
|---|---|
| Saturated aqueous sodium perborate | 50 |
| Acetone | 50 |

After treatment, the prints were dried and exposed to fluorescent light (two 15 watt lamps at 12 inches distance) for 16 hours. Prints B, C, and D showed little or no background darkening whereas print A (control) showed a substantial amount of background darkening.

EXAMPLE 3

Coated sheets prepared as in Example 1 were contact exposed through a positive transparency for 2 seconds with a sun lamp at 7.5 inches, then blanket exposed for 3 seconds to a projected light from a Bell & Howell slide projector (300 watt lamp at 3 feet, equivalent to 8× enlargement) and then developed at 140° C., as in Example 2, to give negative mode prints A, A′, B, B′, C and C′. The prints were dipped for 10 minutes into the following respective formulations:

(A, A′)

| | Ml. |
|---|---|
| Aqueous hydrogen peroxide, 30% | 15 |
| Acetone | 85 |

(B, B′)

| | |
|---|---|
| Di-tert-butyl peroxide | 15 |
| Acetone | 75 |
| Water | 10 |

(C, C′)

| | |
|---|---|
| Saturated aqueous sodium perborate | 50 |
| Acetone | 50 |

Samples of prints treated as above (A, B and C) and untreated were protected from light and other samples of prints treated as above (A′, B′ and C′) and untreated were exposed to fluorescent light (two 15 watt lamps at 12 inches) for 24 hours. The prints that were untreated and exposed turned dark brown in comparison to the untreated prints protected from light. There was no discernible difference between exposed prints B′ and C′ and similarly treated prints B and C protected from light. Exposed print A′ was only slightly darkened in comparison to similarly treated but unexposed print A.

EXAMPLE 4

Coated sheets prepared as in Example 1 were exposed through a transparency for 6.6 seconds with a Bell & Howell slide projector (300 watt lamp at 3 feet, equivalent to 8× enlargement), then blanket exposed to an RS sun lamp at 7.5 inches for 2 seconds and then developed at 140° C., as in Example 2, to give positive mode prints A, A′, B, B′, C and C′.

The prints were dipped for 10 minutes into the following respective formulations:

(A, A′)

| | Ml. |
|---|---|
| Aqueous hydrogen peroxide, 30% | 15 |
| Acetone | 85 |

(B, B′)

| | |
|---|---|
| Di-tert-butyl peroxide | 15 |
| Acetone | 75 |
| Water | 10 |

(C, C′)

| | |
|---|---|
| Saturated aqueous sodium perborate | 50 |
| Acetone | 50 |

Samples of prints treated as above (A, B and C) and untreated were protected from light and other samples of prints treated as above (A′, B′ and C′) and untreated were exposed to fluorescent light (two 15 watt lamps at 12 inches) for 24 hours. The prints that were untreated and exposed turned dark brown in comparison to the untreated prints protected from light. There was no discernible difference between exposed prints B′ and C′ and similarly treated prints B and C protected from light. Exposed print A′ was only slightly darkened in comparison to similarly treated but unexposed print A.

EXAMPLE 5

A series of contact prints were made from a continuous tone photographic negative on paper coated as in Example 1. The light source was an RS sun lamp at 7.5 inches and exposures were made for 1, 2, 3, 4 and 6 seconds. The prints were then developed at 150° C. for a time sufficient to develop a good density in the areas of maximum exposure without discoloring high-light areas.

The developed prints were immersed for 20 minutes in solution B, B′ of Example 4, and then dried and exposed to fluorescent light (two 15 watt lamps at 12 inches) for 24 hours. The prints were effectively stabilized even in continuous tonal areas.

EXAMPLE 6

Example 5 was repeated except that dioxane was used in place of acetone. Good stabilization was achieved.

EXAMPLE 7

Example 5 was repeated except that methanol was used in place of acetone. Good stabilization was achieved.

EXAMPLE 8

Example 5 was repeated except that 1 drop of 10% sodium hydroxide was added to the stabilizing solution. Contrast in the stabilized print was increased.

EXAMPLE 9

Example 5 was repeated except that 1 drop of HCl was added to the stabilizing solution. Contrast in the stabilized print was decreased.

EXAMPLE 10

Prints A, B, C, D, E and F obtained by contact exposure through a negative of paper coated as in Example 1. Exposure was made for two seconds with an RS sun lamp at 7.5 inches. The prints were developed for 2.5 minutes at 155° C. and then immersed in the following respective formulations for 10 minutes, shaken free of excess liquid, dried and exposed to fluorescent light (two 15 watt lamps at 12 inches) for 16 hours:

(A) (Control)
Acetone—9 ml.
Water—1 ml.
(B) Di-tert-butyl peroxide—1.5 ml.
Acetone—7.5 ml.
Water—1.0 ml.
(C) Aqueous hydrogen peroxide, 30%—1.5 ml.
Acetone—8.5 ml.
(D) Saturated aqueous urea peroxide—2.5 ml.
Acetone—7.5 ml.
(E) Perchloric acid—1 drop
Acetone—9 ml.
Water—1 ml.
(F) Saturated aqueous sodium perborate—5 ml.
Acetone—5 ml.

Prints B through F were effectively stabilized. Print A was not stabilized and was substantially darkened in background areas.

EXAMPLE 11

Following the procedure of Example 1, N-vinylcarbazole and carbon tetrabromide can be dispersed in continuous phases of casein, polyvinyl alcohol, gum arabic, starch, sodium carboxymethylcellulose or hydroxyethylcellulose. The formulations can be coated on paper and exposed and heated as in Example 1 to form negative-mode images thereon. The paper is cut into strips and separate strips of each formulation type can be dipped for five minutes into aqueous acetone solutions containing 10 weight percent tert-butyl hydroperoxide, 0.1 weight percent dibenzoyl peroxide, 0.5 weight percent cyclohexanone peroxide, 15 weight percent tert-butyl peroxyacetate, 5 weight percent diisopropyl peroxydicarbonate, or 3 weight percent dicumyl peroxide. In each case, stability of the image is achieved.

EXAMPLE 12

Following the procedure of Example 1, separate aqueous gelatin dispersions of N-vinylcarbazole and tribromochloromethane, pentabromoethane, hexachloroethane, bromotrichloromethane, p-dichlorobenzene or 2,2,2-tribromo-ethanol can be coated on paper, exposed and heated to form negative mode images thereon. The papers can be immersed in a 5% aqueous acetone solution of di-tert-butyl peroxide for 3 minutes to stabilize the image on each sheet.

EXAMPLE 13

Following the procedure of Example 1, separate aqueous gelatin dispersions of carbon tetrabromide and N-ethylcarbazole, indole, diphenylamine, benzothiazoline or benzoxazoline, can be coated on paper, exposed and heated to form negative mode images thereon. The papers can be immersed in a 7% aqueous acetone solution of di-tert-butyl peroxide for 10 minutes to stabilize the image on each sheet.

EXAMPLE 14

Separate aqueous gelatin dispersions of carbon tetrabromide and N-vinylcarbazole can be prepared and coated on baryta paper following the procedure of Example 1. The coated sheets can be exposed to an 8× projected positive Kodachrome image (Bell & Howell slide projector 300 watt lamp) at 3 feet, for 10 seconds, left at room temperature for 15 minutes to enable a colorless polymer image to form, exposed for 1 second with a sunlamp at 7.5 inches and then developed for 1 hour at 140° C., to obtain positive mode photographs. The photographs can be immersed for 5 minutes in the following aqueous-organic solvent solutions containing 3 weight percent di-tert-butyl peroxide: a 50:50 weight percent solution of methanol:water, a 30:70 weight percent solution of acetone:water, a 5:55:40 weight percent solution of benzene:ethanol-water, a 40:50:10 weight percent solution of methanol:ether:water, a 5:40:55 weight percent solution of p-dioxane:acetone:water and a 10:60:30 weight percent solution of m-dioxane:methanol:water, to desensitize the image on each sheet.

EXAMPLE 15

A formulation can be prepared following the procedure of Example 1, but which additionally contains 4 grams of sodium perborate, added subsequent to dispersion of the N-vinylcarbazole and carbon tetrabromide. The formulation can be coated on paper and exposed and heated as in Example 2 to yield a negative mode image. By immersing the paper in water for about 1 minute, the background areas can be desensitized so as to retard darkening upon prolonged exposure to light.

EXAMPLE 16

A formulation can be prepared as in Example 15 but which additionally contains 4 grams of lithium nitrate trihydrate, sodium orthophosphate dodecahydrate, borax, kalinite, or Glauber's salt. The sheet can be exposed as in Example 15, but then heated for 5 minutes at 35° C., 48° C., 64° C., 70° C., or 100° C., respectively, to yield records with backgrounds that resist darkening.

With each of the above formulations, prior to heating, an overcoating of Scotch tape, or other flexible, transparent, water-impermeable material, can be applied to retain moisture and enhance desensitization.

It will be understood that modifications and variations may be effected without departing from the scope of the novel concepts of the present invention.

We claim:

1. In a process in which a photographic image is formed by exposure to actinic light of a photo-sensitive combination of:

(a) an organic halogen compound selected from the group of compounds which produce free radicals or ions upon exposure to light of a suitable wavelength and in which there is present at least one active halogen selected from the group consisting of chlorine, bromine, and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film-forming hydrophilic binder, the improvement whereby image and background areas are stabilized, which comprises applying a solution of a stabilizing amount of a compound having a reactive oxygen atom and selected from (1) organic peroxides and hydroperoxides and (2) inorganic peroxides, perchlorates and perborates.

2. The improvement of claim 1 wherein said organic peroxide is selected from diacyl peroxides, ketone peroxides, peroxyesters and dialkyl peroxides.

3. The improvement in claim 2 wherein the oxygen atom-containing compound is dialkyl peroxide.

4. The improvement of claim 3 wherein the oxygen atom-containing compound is di-tert-butyl peroxide.

5. The improvement of claim 1 wherein the organic halogen compound is selected from the group consisting of carbon tetrabromide, tribromochloromethane, dibromodichloromethane, tribromoacetic acid, pentabromoethane, ethyl tribromoacetate, hexachloroethane and hexachloroethane and hexabromoethane.

6. The improvement of claim 1 wherein the nitrogen atom-containing compound is an N-vinyl compound.

7. The improvement of claim 1 wherein the nitrogen atom-containing compound is selected from the group consisting of N-vinylcarbazole, N-ethylcarbazole, indole and diphenylamine.

8. The improvement of claim 7 wherein the binder is selected from the group consisting of gelatin, casein, polyvinyl alcohol, gum arabic, starch, alkali metal carboxymethylcellulose and hydroxyethylcellulose.

9. The improvement of claim 1 wherein the reactive oxygen atom-containing compound is in an aqueous solution of water-miscible organic solvent.

10. The improvement of claim 9 wherein the oxygen atom-containing compound is soluble in said organic solvent and insufficient water is present to cause substantial precipitation of the oxygen atom-containing compound from said solution.

11. The improvement of claim 1 in which said stabilizing amount comprises at least 0.1 weight percent of said solution.

12. The improvement of claim 7 in which said stabilizing amount comprises from about 0.1 to about 15 weight percent of said solution.

13. A transparency suitable for use as an image mask for an actinic light source in a photographic reproduction process, which comprises a photographic image in a solid film forming hydrophilic binder on a translucent carrier formed by exposure to actinic light of a photosensitive combination in said binder of:

(a) an organic halogen compound selected from the group of compounds which produce free radicals or ions upon exposure to light of a suitable wave length and in which there is present at least one active halogen selected from the group consisting of chlorine, bromine, and iodine, attached to a carbon atom having not more than one hydrogen atom attached thereto, and (b) an aromatic nitrogen atom-containing compound which is able to form a color with said halogen compound under the influence of actinic light, wherein image and background areas have been stabilized by applying thereto an aqueous solution of a water-miscible organic solvent, said solution containing a stabilizer for the combination.

14. The transparency of claim 13 in which said stabilizing amount comprises at least 0.1 weight percent of said solution.

15. A transparency suitable for use as an image mask for an actinic light source in a photographic reproduction process, which comprises a photographic image in a solid film-forming hydrophilic binder on a translucent carrier formed by exposure to actinic light of a photosensitive combination in said binder of:

(a) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto, and (b) an aromatic nitrogen atom-containing compound which is able to form a color with said halogen compound under the influence of actinic light, wherein image and background areas have been stabilized by applying thereto a solution of a stabilizing amount of a compound having a reactive oxygen atom and selected from (1) organic peroxides and hydroperoxides and (2) inorganic peroxides, perchlorates and perborates.

16. The transparency of claim 15 in which said stabilizing amount comprises from about 0.1 to about 15 weight percent of said solution.

17. In a process in which a photographic image is formed by exposure to actinic light of a photosensitive combination of:

(a) an organic halogen compound selected from the group of compounds which produce free radicals or ions upon exposure to light of a suitable wave length and in which there is present at least one active halogen selected from the group consisting of chlorine, bromine, and iodine, attached to a carbon atom having not more than one hydrogen atom attached thereto, and (b) an aromatic nitrogen atom-containing compound which is able to form a color with said halogen compound under the influence of actinic light, said compounds being dispersed in a solid film-forming hydrophilic binder, the improvement whereby image and background areas are stabilized, which comprises applying an aqueous solution of a water-miscible organic solvent, said solution containing a stabilizer for the combination.

References Cited

UNITED STATES PATENTS

| | | | |
|---|---|---|---|
| 3,121,632 | 2/1964 | Sprague et al. ______ | 96—90 X |
| 3,374,094 | 3/1968 | Wainer et al. _______ | 96—67 X |

NORMAN G. TORCHIN, Primary Examiner

R. E. FICHTER, Assistant Examiner

U.S. Cl. X.R.

96—67, 88, 90